Oct. 7, 1952        G. L. LANG        2,613,351

RADIO NAVIGATION DEVICE

Original Filed Aug. 7, 1943

INVENTOR
G. L. LANG
BY
Herbert J. Thompson
ATTORNEY.

Patented Oct. 7, 1952

2,613,351

UNITED STATES PATENT OFFICE 2,613,351

RADIO NAVIGATION DEVICE

Gregor L. Lang, Suffield, Conn., assignor to The Sperry Corporation, a corporation of Delaware Continuation of abandoned application Serial No. 497,786, August 7, 1943. This application May 18, 1948, Serial No. 27,732

13 Claims. (Cl. 343—107)

This invention relates to navigation instruments and more particularly to indicating devices for denoting the proper approach of a craft to a given course.

This application is a continuation of my prior patent application Serial No. 497,786, filed August 7, 1943, now abandoned.

Although the invention is susceptible to use with various types of land vehicles and marine vessels, the invention is particularly applicable to aircraft and for convenience is herein described as applied thereto. It is common practice for aircraft to fly exclusively by instruments along radio ranges or beams of distinctively-modulated overlapping lobes of radio frequency energy extending from a transmitting station. The pilot may fly his craft along a course represented by the equisignal axis of the overlapping portions, and since the energy in each lobe is distinctive from the other, departures to the right or left of the course may be readily identified. Similar radio beams have been utilized for instrument landing purposes, in which event the equi-signal line or axis extends at a slight angle to the horizontal to form a glide path, deviations then being detected in a vertical plane.

It often becomes necessary for a pilot to maneuver his ship onto a course defined by such a glide path or directional radio beam from a position laterally displaced therefrom. The pilot's deviation from the course customarily is manifested by a characteristic audible signal, and usually also by a visual indicator, such as an electric meter having a pointer denoting the direction and extent of the displacement. Upon learning of a deviation from course, the pilot normally varies the heading of his craft to a new heading, and proceeds until the audible or visual indications are restored to normal. Thus, if the visual indicator or left-right meter denotes that the craft has veered to the right from its course, the pilot applies left rudder to change the heading of the craft in a direction to restore the craft to its course, and then observes the gradual restoration of the meter pointer to a zero position, at which time the craft will have reached the equi-signal line of the beam. However, unless precise and prompt correction of heading is then made, the craft will overshoot the course, requiring the pilot to attempt once more to choose a heading at an angle to course in order to return to the path. The tendency, therefore, is for the craft to "hunt" on opposite sides of the beam in a manner that is disconcerting to the pilot, since it is difficult to orient the craft properly relative to the course direction at the moment that the craft reaches the course. The problem is to reach an "on course" position with a simultaneous correct heading.

Some skilled pilots compensate somewhat for the effect of "hunting" by progressively varying the craft heading in accordance with the changes in the meter indications, but such a procedure involves considerable skill and experience based on correlating the successive craft headings with the rate at which the visual indicator changes, requiring some mental operations on the part of the pilot and thus being subject to error, and distracting the pilot from other duties.

The present invention relieves the pilot of this burden by incorporating, in the meter indication, a function of the rate at which the detected displacement is changing, and accordingly the relative rate at which the aircraft is approaching or leaving its course. The improved instrument thereby guides the pilot as to the heading to be held by the craft to bring it along a curvilinear path into the course, allowing relatively inexperienced pilots to avoid overshooting; and it provides a ready and positive indication of the successive headings to be held by the craft so as to approach the course in a generally tangential or asymptotic manner.

The principal objects of the present invention are: to provide an improved indicator for denoting deviations from the optimum instantaneous headings of a craft relative to a chosen course; to provide a visual or other type indicator denoting when a craft is making a proper asymptotic or "dead-beat" approach to a given course; to provide a neutral indication to the pilot even when his craft is displaced from its course, provided that the craft is properly approaching the course; to provide a navigation instrument which designates partially the displacement of a craft from its course, which instrument is partially controlled also by the rate at which the craft approaches its course; to provide a left-right meter having means for subtracting a rate function from a displacement function to produce the flight indication presented for the pilot when the craft approaches its course; to provide an instrument sensitive to either or both displacement and time rate of change of displacement; and to provide means for adjusting the sensitivity of such an instrument to either or both the displacement and rate signals. These and other objects of the invention will become more apparent from the following description and from the accompanying drawing describing various embodiments of the present invention.

Generally speaking, the invention comprises radio aircraft receiver means capable of producing signals as a function of the lateral displacement or angular error in bearing of the craft from a prescribed ground track. These signals are applied to an indicator such as a meter having a pointer deflected according to the amplitude of the signal. A second signal, derived as a function of the rate at which the displacement signals vary, is mixed with the first signal, and applied to the meter so that it indicates the algebraic sum of both signals, the rate signal subtracting from the displacement signal whenever the craft approaches its course, and adding to displacement during divergence from course.

Thus, the signal which may be derived as a function of the rate of change of displacement of the craft from the course corresponds to a signal of reversible polarity according to the direction of movement of the craft. When the craft moves in the direction to come into the course, this direction or rate signal has the polarity for opposing the displacement signal; and when it moves in the direction divergent from the course, the direction or rate signal is of the other polarity, augmenting the displacement signal to cause great deflection of the indicator.

In the former case, the pilot is made aware that, whatever his position, his heading is substantially optimum relative to his displacement, if any, from the course. In the latter case, he is apprised of the need for drastic correction of heading.

Figure 1:
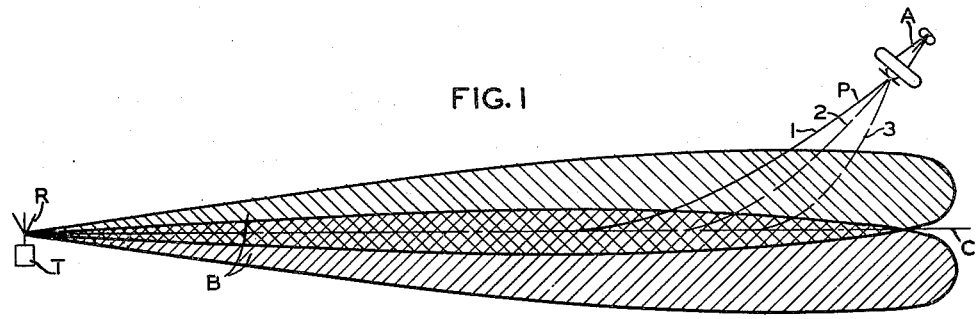
Fig. 1 is a diagram of a radio beacon or course formed by the line of symmetry of two intersecting directive radiation patterns or beams.

Referring now more particularly to the drawing, Fig. 1 discloses in diagrammatic form a transmitter T having a radiator system R adapted to project beams or lobes of eletromagnetic energy B, the axis of symmetry of which comprises the course C along which the craft is to travel. The respective beams B comprise directivity patterns of electromagnetic energy usually diverging slightly in either the horizontal or the vertical planes, according to the use to which the system is to be put. For example, if the invention is applied to instrument landing the lobes may extend one above the other so that the course C is disposed at an angle of the order of a few degrees to the horizontal landing field. If the system is to form a radio range, the respective beams are separated in a horizontal plane with the course C oriented properly in azimuth according to the desired direction of the course. The respective lobes are distinctly modulated, as by the usual A-N signals, or by varying a characteristic of the carrier at different audio rates, typically by amplitude modulating the carrier at 600 and 900 cycles per second, respectively. The energy detected from the respective beams provides a neutral or balanced signal when the energy is received along the course C, but any deviation from the course results in an unbalanced condition producing corresponding displacement signals in the aircraft receiver, which signals are a function of the displacement of the craft from the course C at any given distance from the transmitter T. A typical receiver adapted to this purpose as applied to instrument landing is described in W. T. Cooke et al. Reissue Patent No. 22,484, dated May 23, 1944. Such receivers make use of an up-down or right-left meter M of the type shown in Fig. 2, the pointer 11 of which is adapted to denote a function of the lateral displacement of the craft, such as an aircraft A from its course C. Often the vertical and horizontal displacements of a craft from a driven course are designated on a single meter having crossed pointers in the general manner shown in F. A. Jenks et al. patent, Des. 135,322, dated March 23, 1942. To simplify the present description, lateral displacement from course will be designated along a single plane with a single pointer, it being understood that the system is applicable to measurements in two planes merely by duplication of equipment.

Figure 2:
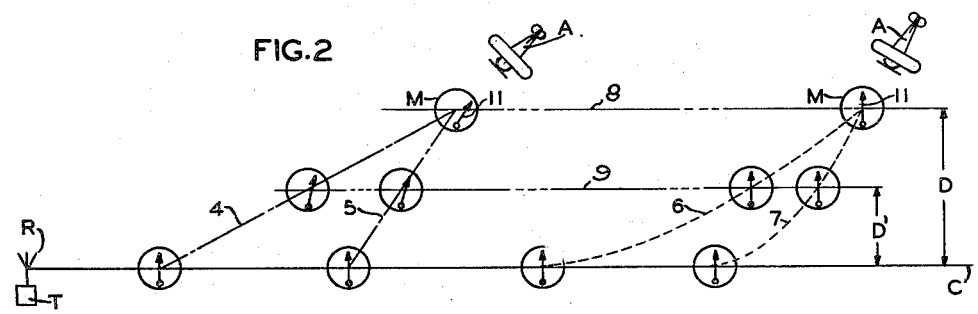
Fig. 2 is a diagram illustrating the visual indication accorded to aircraft pilots with former and the present improved systems, respectively.

Various approaches to a course are diagrammatically illustrated in Figs. 1 and 2. The problem is to have the aircraft A approach the course C in such a manner that the craft motion follows the direction of the course C when the craft reaches the course. The aircraft accordingly should follow a curved path P designated in Fig. 1 by the solid line 1 or by the broken lines 2 and 3. The sharper the angle that the path P initially forms with the course C, the more rapid must be the change in heading as the craft approaches the course.

According to presently known systems, such for example as the system of U. S. Patent 2,439,044, issued April 6, 1948, to Thomas M. Ferrill, Jr., and assigned to the assignee of the present application, an aircraft A displaced at a predetermined appreciable distance D from the course C (i. e., on line 8) provides the pilot with a full scale "off course" indication on meter M as shown at the left in Fig. 2. The normal procedure is for the pilot to approach the course along straight paths such, for example, 4 or 5 respectively, as shown at the left of Fig. 2, by directing the craft toward the course along any selected heading. As the craft approaches the course C along either path the pointer 11 moves gradually towards its neutral position. The pointer 11 is at one half maximum displacement when the craft passes line 9 separated from the course by a displacement D', the meter readings still denoting the actual displacement from course C. Unless the pilot, anticipating his approach to the course by observing the rate of pointer movement, has gradually changed the craft heading toward the right by precisely the correct amount, the craft will continue generally along the paths 4 or 5, beyond the course C. Displacement to the left (opposite) side of the course follows; and hazardous "hunting" would prevail.

With the improved arrangement diagrammatically illustrated at the right of Fig. 2, the meter M provides a neutral indication, or what corresponds to the "on course" designation as obtained with displacement-sensitive systems alone, at all displacement positions, if the craft is heading properly onto the course along curved paths such as paths 6 and 7, with progressively changing cross-beam velocity as the craft proceeds. The pilot thereby flies the craft so as to maintain a continued neutral reading on the meter M, requiring a progressive shifting of the aircraft heading as the ship approaches the course. This result is obtained by reducing the signal resulting from the craft displacement by an amount proportional to the time rate at which the displacement decreases. Since this rate corresponds substantially with craft direction relative to the course, the improved arrangement goes beyond mere positional indication, and gives a continuing indication as to how the pilot should control the craft heading.

Accordingly, when the displacement signal is large, the neutralizing rate signal also must be large, and must be obtained by flying the craft on an initial heading aimed steeply to intersect the course. As the displacement signal decreases, the rate or direction signal must be correspondingly decreased by modifying the craft direction to decrease its angle relative to the course, to maintain a balanced condition with the pointer 11 substantially neutrally positioned. The displacement signal may be derived in any conventional manner according to the type of course signal radiated from the transmitter, e. g., as shown in the W. G. Harding et al. Patent No. 2,201,174. The paths 6 and 7 thus curve gradually and approach the course C in a substantially tangential or asymptotic manner if the pilot flies the airplane so as to maintain the meter reading neutral at all times. The curvatures of the paths 6 and 7 depend upon the initial adjustment of the apparatus, as will become apparent.

Figure 3:
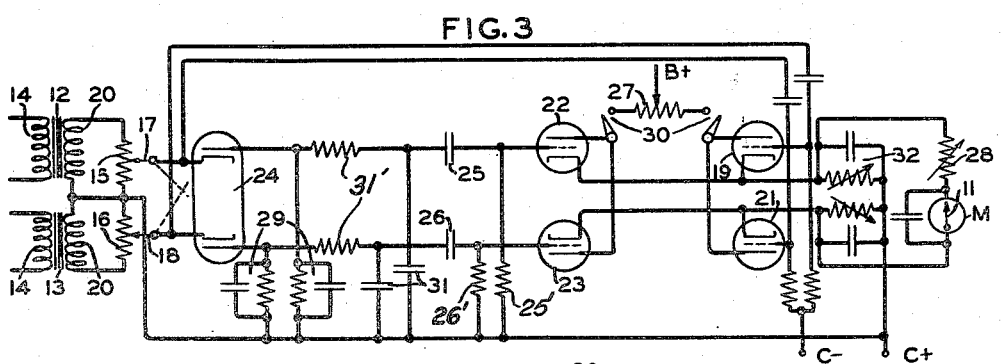
Fig. 3 is a wiring diagram of a circuit incorporating principles of the invention.

Fig. 3 discloses a typical circuit by which the foregoing may be obtained. The circuit comprises the audio output portion of an aircraft receiver of the general type shown in said Reissue Patent No. 22,484 and in said Patent No. 2,439,044. Output transformers 12 and 13 have primary windings 14 that connect respectively with the output of the usual filter circuits (not shown) for segregating the modulation components of the respective beams B. The signals appearing across the secondary windings 20 of the transformers 12 and 13, oppose one another across dual potentiometers 15 and 16 having ganged sliders 17 and 18 which move in balanced relation along the resistance elements of the potentiometers. The signal developed across the sliders is the difference signal or net displacement signal, which varies as the lateral distance of the craft from the course C defined by the beams, having a polarity determined by the direction of the displacement from course. The displacement signal is applied to the meter M after being rectified in thermionic tubes 19 and 21.

The circuit of Fig. 3 comprises generally a rectifier stage 24, rate taking stage 25, 25' and 26, 26', a cathode follower stage 22, 23 and a mixer stage 19 and 21, the output of which is connected to the indicating meter 11. The displacement signal appearing at the outputs 17 and 18 of potentiometers 15 and 16 is rectified through a dual diode 24. Smoothing circuits 29, 31 and 31' are provided for smoothing the D. C. output of rectifier 24. In accordance with the principal feature of the present invention, the rectified displacement signal is applied to an impedance-reactance rate taking network such as the resistance-capacitance network 25, 25' and 26, 26' the output of which across resistances 25' and 26' is proportional to the time rate of change of the input displacement signal and is applied to the grids of cathode followers 22, 23. From one point of view, the operation of the rate taking circuits may be described as follows. The condensers 25 and 26 of the RC networks, having an impedance inversely proportional to frequency, will pass only an increasing or decreasing signal voltage and the voltage impressed across the resistances 25' and 26' will be proportional to the rate at which the signal voltage increases or decreases. On the other hand, when the signal voltage at the condensers 25, 26 is constant or not changing, no voltage will be impressed across the resistances 25' and 26'. The voltage across resistances 25' and 26', which is proportional to the rate of change of the displacement signal voltage, is applied to the grids of cathode followers 22, 23. The cathodes of cathode followers 22 and 23 are connected respectively to the cathodes of a pair of mixer tubes 19 and 21, suitable cathode follower circuits 32 being provided. The displacement signals at 17 and 18 are impressed, through suitable coupling condensers, upon the grids of tubes 19 and 21. The displacement signal and the rate signal are combined or mixed in opposing sense and the resultant signal is applied to the indicating meter M.

The anode elements of both pairs of tubes 19, 21, and 22, 23, are connected in parallel and are supplied with positive direct voltage through a potentiometer 27 connected as shown in Fig. 3. The cathodes of the tubes 19 and 22 are connected together, as are the cathodes of the tubes 21 and 23, the respective pairs being connected to the meter M through a suitable deflection control resistor 28.

In operation, the circuit shown in Fig. 3 separates the displacement signals from the time rate of change of displacement signals appearing on the grids of tubes 22 and 23. The signals are mixed before being applied to the meter M in such a way that rate signals produced by motion of the craft toward the course subtract from the amplitude of the displacement signal. The sharpness of the angular approach to the course depends upon the relative strength of the rate and displacement signals and may be adjusted by controlling the position of the slider of potentiometer 27, or by any other manner varying the gain of the circuits producing the respective signals. For a sharp approach as along the line 3, the gain of the rate signal circuit is made low, requiring a large time rate of change of the displacement signal to counterbalance the displacement signal. Conversely, for a shallow approach as along the path 1, a small time rate of displacement signal is amplified highly so as to equal the displacement signal. The tubes 19, 21, 22 and 23 operate as a mixer, with the signals subtracting when the craft approaches the course and adding when the craft leaves the course. The present arrangement thereby provides increased sensitivity of the indicator to deviations from course in that the displacement signals and the time rate of change of displacement signals are additive when the craft moves away from the course.

Switches 30 may be provided to render the indicator responsive to but one of the separate circuits, whereby the pilot may at any time determine either absolute rate or absolute displacement, from the meter indication.

Figure 4:
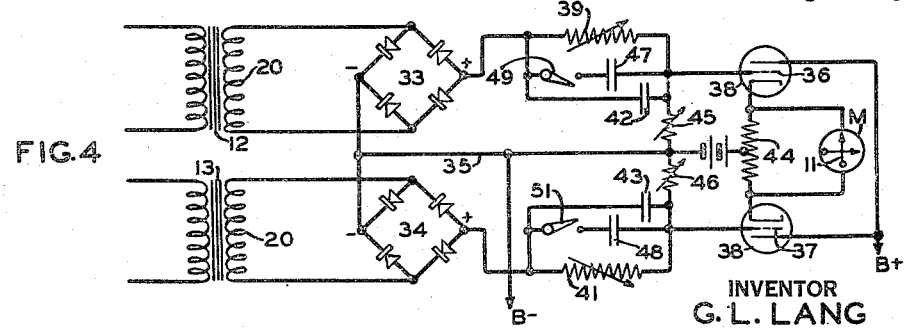
Fig. 4 is a diagram showing a simplified version of Fig. 3.

Fig. 4 illustrates a simplification of the circuit shown in Fig. 3. The secondary windings 20 of the transformers 12 and 13 are each connected to a bridge rectifier 33 and 34, respectively, one side of each of which may be connected to the negative terminal of the plate voltage supplied through wire 35. The opposite side of each rectifier 33, 34 connects with the grids 36 and 37 of a dual triode 38 through a pair of variable resistances 39 and 41, across which a component of the displacement signal will appear, and a pair of variable time-constant rate circuits 42, 47 and 45; and 43, 48 and 46. Again, the cathodes of the dual triode 38 are connected to the meter M through a center tap resistor 44 which provides a load across which the combined rate and displacement signals may be developed. The value of the displacement signal may be varied by varying the impedance of the resistors 39 and 41. The rate circuits 42, 47 and 45; and 43, 48 and 46 operate in the same manner as the rate circuits described in Fig. 3.

The operation of the arrangement shown in Fig. 4 is as follows: Assuming that the resistors 39 and 41 have an infinite resistance, the displacement signals are impressed across the condensers 42 and/or 47, and 43 and/or 48, as the case may be, and resistances 45, 46 which circuits, as explained above, derive a signal proportional to the time rate of change of the displacement signal. Therefore, the meter M becomes sensitive only to time rate of change of the effective displacement signal. Conversely, assuming capacitors 42 and 47 or 43 and 48 to have infinite impedance, the displacement signal is impressed across the resistances 39, 45 and 41, 46. Since the capacitance in the circuits is infinite, no rate of change of displacement signal will be derived and the meter M indicates only the displacement signals. Hence, by varying the relation between the resistance and the capacitance in both circuits, the effect of displacement signals and rate signals on the meter M may be controlled. From the above, it will be noted that the proportional amount of displacement signal applied to the grids of tube 38, as compared to the rate signal, may be varied by controlling the value of the resistances 39 and 41 and also that these relative signal values may be controlled by varying the time constant of the rate circuit, as by increasing the effective capacitance of the circuit by adding condensers 47 and 48 through switches 49 and 51, by changing the value of the resistances 45 and 46, or by performing both operations. The two signals are so combined, as to sign, as to buck or neutralize each other when the craft is approaching the desired course and to augment each other when the craft diverges from the desired course. Displacement signals representing an off-course position of the craft may be neutralized by time rate of displacement signals passing through condensers 42 and 43, as the craft approaches its course. In other words, with the craft approaching the desired course in the proper manner, the magnitude of the rate signal will equal the magnitude of the displacement signal and since the two signals are combined in an opposing sense, the indicator will supply to the pilot a zero indication.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

This application contains certain features in common with the applications of Winslow Palmer, for Radio Navigation System for Dirigible Craft, Serial No. 761,354, filed July 16, 1947, and Spencer Kellogg, 2nd, for Flight Indicating System for Dirigible Craft, Serial No. 15,064, filed March 16, 1948, assigned to the same assignee as this application, and all of which are issuing concurrently.

What is claimed is:

1. A navigation device for indicating proper heading of an aircraft when flying a curved path leading substantially tangentially to a straight course lying along the equi-signal line of a pair of overlapping distinctively-modulated directional radio beams, comprising means for deriving a difference signal as a function of the difference in an intensity characteristic of said respective beams, means controlled by said difference signal for deriving a rate signal proportional to the time rate of change of said difference signal, and an indicating instrument responsive to said difference signal and to said rate signal.

2. A navigation device for indicating proper heading of an aircraft when flying a curved path leading substantially tangentially to a straight course lying along the equi-signal line of a pair of overlapping distinctively-modulated directional radio beams, comprising means for deriving a difference signal as a function of the difference in an intensity characteristic of said respective beams, means controlled by said difference signal for deriving a rate signal proportional to the time rate of change of said difference signal, and an indicating instrument responsive to said difference signal and to said rate signal, said device including a mixer for combining in an opposite sense said rate signal and said difference signal when said aircraft flies toward said beam.

3. A navigation device for indicating proper heading of an aircraft when flying a curved path leading substantially tangentially to a straight course lying along the equi-signal line of a pair of overlapping distinctively-modulated directional radio beams, comprising means for deriving a difference signal as a function of the difference in an intensity characteristic of said respective beams, means controlled by said difference signal for deriving a rate signal proportional to the time rate of change of said difference signal, and an indicating instrument responsive to said difference signal and to said rate signal, said device including a mixer for combining in an opposite sense said rate signal and said difference signal when said aircraft flies toward said beam, said device also including control means for regulating the intensity of each of said signals.

4. An indicator for denoting the proper instantaneous heading of a craft while following an asymptotic approach to a straight flight path defined by the equi-signal zone existing between a pair of overlapping, distinctively modulated radio beams, comprising radio means for producing a first signal proportional to the displacement of said craft from said flight path, differentiating means supplied by a component of said first signal for deriving a second signal proportional to the time rate of change of said first signal, and an indicator responsive to a combination of said first and second signals, said signals being so combined that the indications of said indicator will reflect the sum of said signals during departure of said craft from and the difference of said signals during approach of said craft toward said flight path whereby a substantially asymptotic approach of the craft toward said flight path may be effected by so maneuvering the craft as to cause said indicator to provide substantially a zero error indication while making said approach.

5. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said first signal for deriving a second signal proportional to the time rate of change of said first signal, and means for algebraically combining said signals and supplying an indication to the pilot proportional to the resultant signal.

6. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said first signal for deriving a second signal proportional to the time rate of change of said first signal, amplifier means for combining said signals and supplying an output proportional to the algebraic sum thereof, and a meter of the center zero-reading type connected to receive the output of said amplifier.

7. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said first signal for deriving a second signal proportional to the time rate of change of said first signal, an indicator connected to be controlled in accordance with the algebraic sum of said signals, and means for varying the responsiveness of said indicator to said second signal.

8. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said difference signal for deriving a second signal proportional to the time rate of change of said first signal, an indicator connected to be controlled in accordance with the algebraic sum of said signals, and means for varying the responsiveness of said indicator to said first signal.

9. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said first signal for deriving a second signal proportional to the time rate of change of said first signal, an electronic mixer for algebraically combining said signals, and an indicating means operated in accordance with the output of said mixer.

10. An indicator system for denoting to the pilot of an aircraft correct instantaneous headings of the aircraft in order to effect an asymptotic approach to and maintenance of flight thereafter along a radio-beam-defined flight path, said system comprising means including a radio receiver for providing a first signal proportional to displacement of said craft laterally from said path, means controlled by said first signal for deriving a second signal proportional to the time rate of change of said first signal, means for combining said signals such that said signals are subtractive when the craft approaches the flight path and additive when said craft departs from said flight path, and an indicating means responsive to the output of said combining means.

11. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said first signal for deriving a second signal proportional to the time rate of change of said first signal, means for combining said signals such that the two signals are subtractive when the craft approaches the flight path and are additive when the craft departs from the flight path, indicator means responsive to the output of said combining means, and means for varying the sensitivity of said device to at least one of said signals.

12. An indicator system for denoting to the pilot of an aircraft correct instantaneous headings of the aircraft in order to effect an asymptotic approach to and maintenance of flight thereafter along a radio beam-defined flight path, said system comprising means including a radio receiver for providing a first signal proportional to displacement of said craft laterally from said path, means controlled by said first signal for deriving a second signal proportional to the time rate of change of said first signal, summing means connected to receive both of said signals for providing an output proportional to the algebraic sum thereof, an indicator connected to receive the output of said summing means, and means for rendering said indicator unresponsive to one of said signals.

13. In a system for determining correct instantaneous headings of an aircraft in order to effect an asymptotic approach to and maintenance of flight thereafter along a radio beam-defined path, means including a radio receiver for providing a first signal proportional to displacement of said craft laterally from said path, means controlled by said first signal for deriving a second signal proportional to the time rate of change of said first signal, and means connected to receive said signals for supplying an output proportional to the algebraic sum thereof.

GREGOR L. LANG.

REFERENCES CITED

The following references are of record in the file of this patent:

UNITED STATES PATENTS

| Number | Name | Date |
|---|---|---|
| Re. 23,066 | Moseley | Dec. 21, 1948 |
| 1,315,539 | Carson | Sept. 9, 1919 |
| 1,703,317 | Minorsky | Feb. 26, 1929 |
| 2,099,536 | Scherbatskoy et al. | Nov. 16, 1937 |
| 2,122,091 | Davies | June 28, 1938 |
| 2,257,757 | Moseley | Oct. 7, 1941 |
| 2,266,410 | Busignies | Dec. 16, 1941 |
| 2,322,225 | Crane et al. | June 22, 1943 |
| 2,372,185 | Wittkuhns | Mar. 27, 1945 |
| 2,423,336 | Moseley | July 1, 1947 |
| 2,439,044 | Ferrill | Apr. 6, 1948 |

FOREIGN PATENTS

| Number | Country | Date |
|---|---|---|
| 516,567 | Great Britain | Jan. 5, 1940 |